INVENTOR.
OSCAR E. ROSAEN

BY Hauke & Hauke
ATTORNEYS

Feb. 6, 1968   O. E. ROSAEN   3,367,506
SELF-CLEANING FILTER DEVICE
Filed June 21, 1965   2 Sheets-Sheet 2

INVENTOR
OSCAR E. ROSAEN

BY *Hauke & Hauke*
ATTORNEYS

United States Patent Office 3,367,506
Patented Feb. 6, 1968

3,367,506
SELF-CLEANING FILTER DEVICE
Oscar E. Rosaen, Grosse Pointe Shores, Mich., assignor, by mesne assignments, to The Rosaen Filter Company, Hazel Park, Mich., a corporation of Michigan
Filed June 21, 1965, Ser. No. 465,347
5 Claims. (Cl. 210—408)

ABSTRACT OF THE DISCLOSURE

A filter device having a cylindrical housing, a cylindrical element carried within the housing, an inner housing structure acting as a baffle for the filter element and for fluid flowing into the housing to be filtered, a vane assembly for forcing fluid through the filter element in a direction opposite the normal flow therethrough to thereby clean the element and valves for directing fluid along the exterior surface of the filter element and intermediate the element and the baffle to carry away the foreign particles removed from the element during cleaning.

The present invention relates to fluid filtering apparatus and more particularly to an improved self cleaning filter device.

The filter elements of filtering devices eventually become clogged and unless means are provided for cleaning the element in place they require periodic removal for cleaning or replacement. In order to avoid the time, expense, and inconvenience of periodic filter changing and/or cleaning, a number of self-cleaning filter devices have been heretofore provided. To produce the cleaning action, it is the general practice to provide a reverse fluid flow through the filter element. The force necessary to dislodge foreign particles tending to cling to the filter element has been heretofore produced by injector apparatus or the like. Such apparatus is quite complex in structure and rather expensive to manufacture.

The present invention provides a self-cleaning filter device of an improved construction utilizing rotating vane members to drive the fluid through the filter element in a reverse direction. Means are provided to trap foreign particles removed from the fluid by the filter element and means are provided in the form of a second fluid flow separate from the reverse cleaning flow for insuring that dislodged foreign matter will be carried away from the filter element.

It is an object then of the present invention to improve filtering systems by providing means periodically dislodging foreign matter from the filter element of such systems and means in the form of a separate fluid flow for carrying away the foreign matter so dislodged.

It is a further object of the present invention to prevent the clogging of fluid filters by intermittently ejecting a stream of fluid through the filter in a direction opposite the normal fluid flow while at the same time directing another stream of fluid along the inlet side of the filter element to carry away the foreign matter dislodged by the first mentioned stream of fluid.

It is yet another object of the present invention to eliminate frequent replacement of fluid filters by providing a means operable to dislodge and carry away foreign matter tending to clog the filter element.

It is still another object of the present invention to decrease the amount of fluid necessary to clean a filter element by providing means in the form of a plurality of vane elements for forcing the cleaning fluid in a reverse flow path through the filter element.

Still further objects and advantages of the present invention will readily occur to one skilled in the art to which the invention pertains upon reference to the following drawings in which like reference characters refer to like parts throughout the several views and in which.

Figure 1:
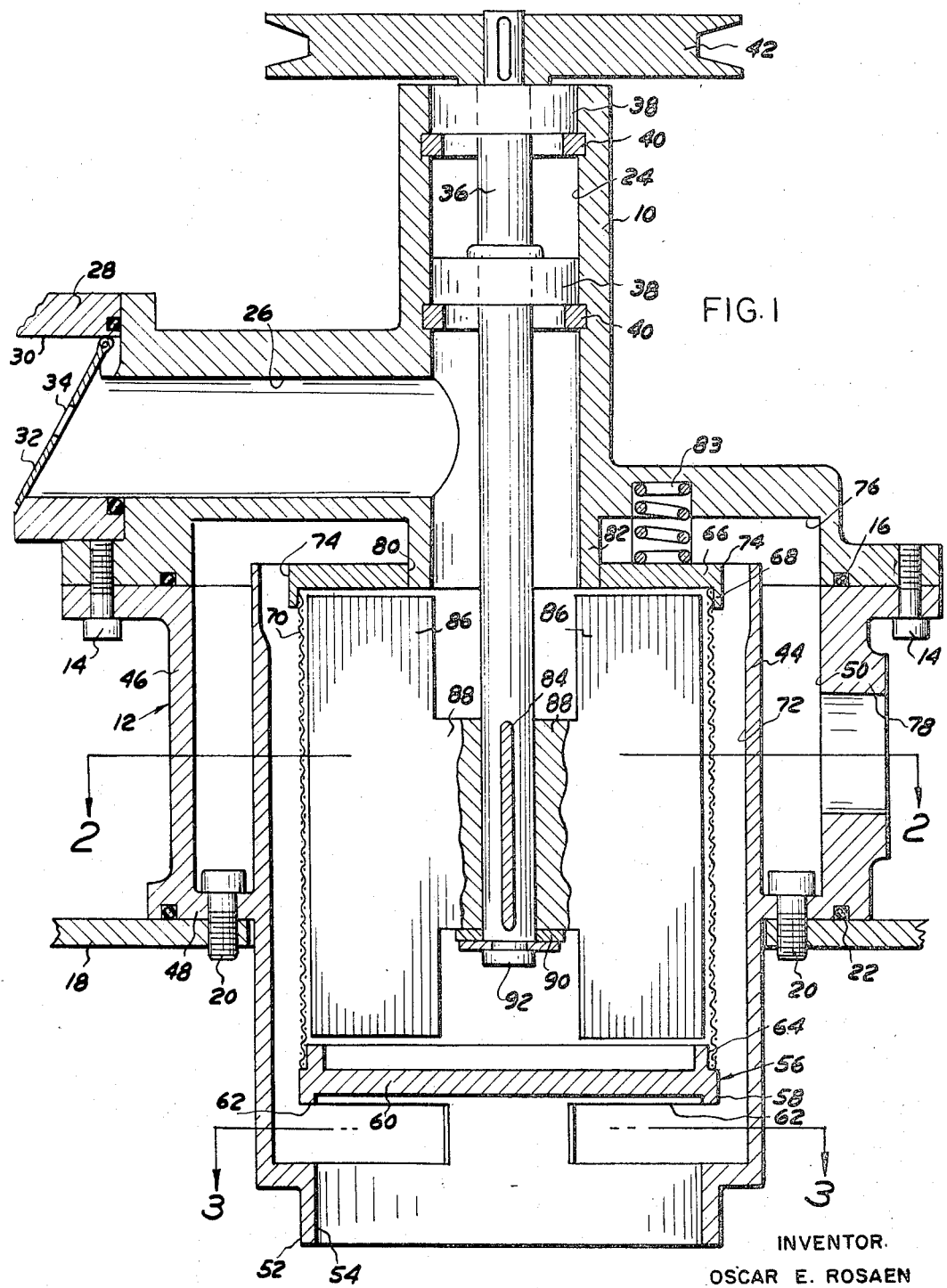
FIG. 1 is a longitudinal cross-sectional view of a preferred filtering device of the present invention.

Now referring to the drawings for a more detailed description of the present invention, a preferred filtering device is therein illustrated as comprising a housing 10 and a casing 12. At best illustrated in FIG. 1, complementary surfaces of the housing 10 and the casing 12 are preferably secured together by bolts or screws 14. An O-ring seal 16 is preferably positioned intermediate the adjacent surfaces of the housing 10 and the casing 12 to prevent fluid leakage therebetween. The casing 12 is preferably mounted to extend into a fluid reservoir 18 and is secured thereto by bolts or screws 20. An O-ring seal 22 is preferably positioned intermediate the reservoir 18 and the casing 12 to prevent fluid leakage therebetween.

The housing 10 is preferably provided with an elongated axially extending bore 24 and a passage 26 substantially normal to and commucating with the bore 24. Passage 26 communicates with a port structure 28 defining a port 30 which is adapted for connection to the intake side of a fluid pump (not shown). A flap type relief valve 32 is preferably carried in the port structure 28 to open in response to fluid flow in a direction toward the pump or to the left in FIG. 1 and to close upon opposite fluid flow through the port 30. The valve 32 is preferably provided with a central aperture 34.

A shaft 36 is rotatably mounted within the bore 24 by axially spaced bearings 38 and extends into the casing 12 as can best be seen in FIG. 1. The bearings 38 are preferably mounted by suitable snap rings 40. A pulley 42 is mounted to the shaft 36 exteriorily of the housing 10 and is adapted to be drivingly connected to a suitable motor means (not shown).

The casing 12 is preferably constructed to form an inner cylindrical wall 44 and an outer substantially cylindrical wall 46 connected by a radially extending web portion 48. The walls 44 and 46 and the web portion 48 define a substantially annular chamber 50. A porting structure 52 is integrally connected with the lower end of the inner wall 44 and forms a port 54 in open communication with the interior of the fluid reservoir 18. A mounting structure 56 extends upwardly from the porting structure 52 into the interior of the inner wall 44 and comprises an axially extending annular portion 58 carrying a radially extending base portion 60 in a position upwardly spaced from the port 54. A plurality of annularly spaced arcuate slots 62 are provided in the axially extending portion 58, and an axially extending flange 64 extends upwardly from the base portion 60.

A radially extending mounting portion 66 is provided at the upper edge of the inner wall 44 and is formed with an axially downwardly extending flange portion 68. The mounting portion 66 and the base portion 60 of the mounting structure 56 provide the means for carrying a cylindrical filter element 70. The filter element 70 is held in position by the flange portion 68 of the mounting portion 66 and the flange 64 of the mounting structure 56. The filter element 70 is radially inwardly spaced from the inner wall 44 to define an annular fluid chamber 72. The chamber 72 is in direct communication with the fluid reservoir 18 through the slots 62 of the mounting structure 56 and the port 54 of the porting structure 52. A plurality of annularly spaced arcuate openings 74 are provided in the mounting portion 66 to provide communication between the chamber 72 and an annular recess 76 formed in the housing 10 and communicating with the chamber 50. A port 78 is provided in the outer wall 46 in communication with the chamber 50.

The mounting portion 66 is provided with a central opening 80 adapted to receive a hollow boss portion 82 of the housing 10 so that the passage 26 and the bore 24 are opened to the interior of the filter element 70. Annularly spaced spring members 83 are biased between the housing 10 and the mounting portion 66.

Figure 2:
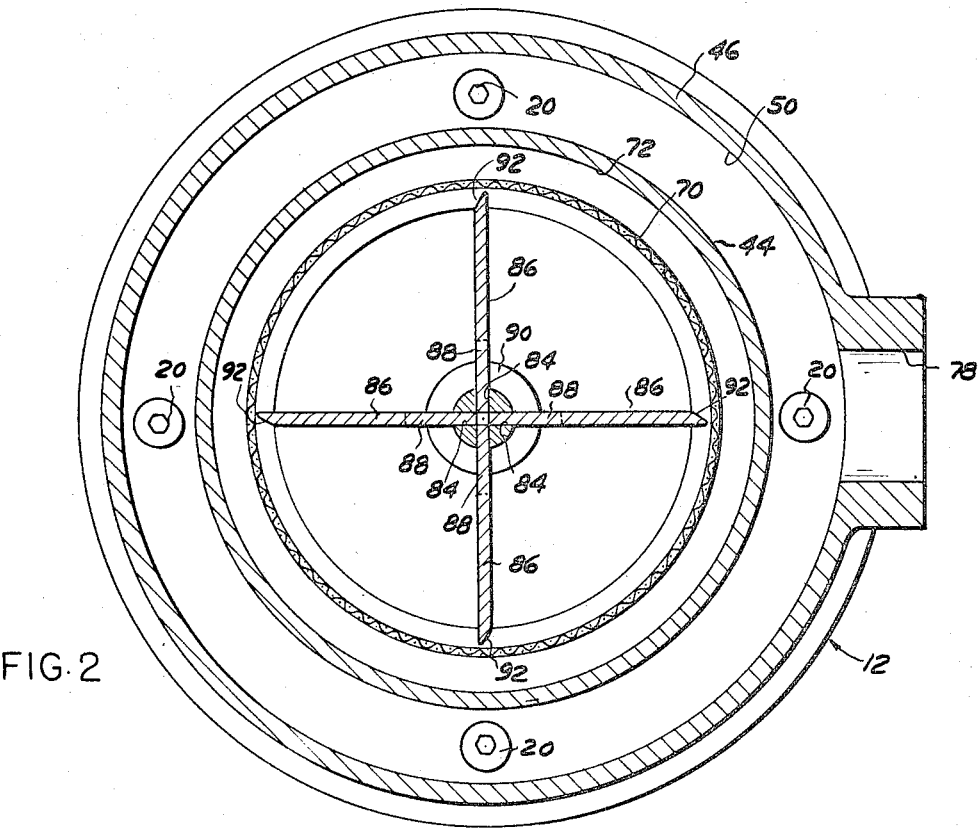
FIG. 2 is a cross-sectional view taken substantially at line 2—2 of FIG. 1.
Figure 3:
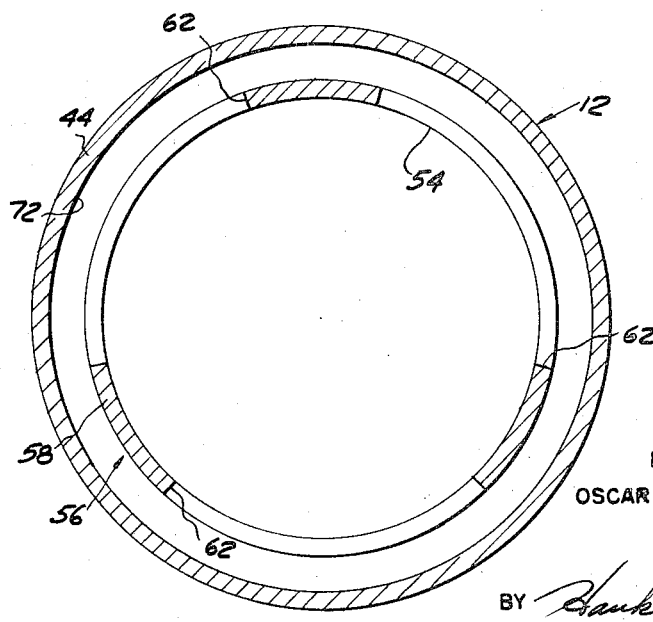
FIG. 3 is a cross-sectional view taken substantially at line 3—3 of FIG. 1.

As can best be seen in FIGS. 1 and 2, the free end of the shaft 36 is provided with a plurality of annularly spaced axially extending slots 84. Vane members 86 are provided with reduced base portions 88 which are carried in the slots 84. A washer 90 and a bolt element 92 urge the vane members 86 against the upper edge forming the slots 84 to securely lock the vane members 86 to the shaft 36. The vane members 86 extend radially from the shaft 36 and are provided at their free edge with a beveled portion 92 which extends closely adjacent the filter element 70 as can best be seen in FIG. 2.

In operation, with the port 30 connected to the intake side of a fluid pump (not shown) and the port 78 closed by any suitable valve means (not shown), fluid is pumped from the reservoir 18, through the port 54, the slots 62, into the chamber 72, radially inwardly through the filter element 70, axially through the bore 24, and through the passage 26. Fluid flow in this direction tends to open the flap valve 32. When the filter element 70 becomes clogged, the motor means (not shown) is actuated to rotate the shaft 36 through the pulley 42 and to thereby rotae he vane members 86 in a clockwise direction. Substantially simultaneously with actuation of the motor means the port 78 is opened to direct a fluid flow into the chamber 50 and a reverse fluid flow is directed through the port 30 and the passage 26. On a reverse flow being produced through the port 30, the flap valve 32 closes, forcing fluid to pass through the aperture 34. The reverse flow fluid is forced radially outwardly through the filter element 70 by the rotating vane members 86 which produce a sufficient velocity and force to dislodge foreign particles accumulated on the exterior or inlet surface of the filter element 70. The fluid flowing through the port 78 and into the chamber 50 is direced through the recess 76 and the ports 74 to flow axially downwardly along the exterior or inlet surface of the filter element 70 where it picks up the foreign particles dislodged by the reverse fluid flow and carries these particles through the port 62 and the port 54 into the fluid reservoir 18.

By providing two separate flows of fluid during cleaning action of the filter element 70 a more effective cleaning of the element 70 is produced. The vane members 86 provide a means of forcing the fluid through the filter element simultaneously in several areas so that cleaning is accomplished in a shorter period of time than heretofore possible. The flap valve 32 and the aperture 34 reduce the amount of fluid used for reverse flow so that loss of fluid in the system during cleaning action is minimized. The inner wall 44 provides a means of trapping the accumulated foreign particles so that they can be washed free of the filter element 70 by the fluid entering the port 78.

It is apparent that a self-cleaning filter device has been provided in which the filter element is cleaned much more effectively than heretofore possible. Further, the necessity of complex and expensive injector apparatus or the like has been eliminated.

It is also apparent that although I have described but a single embodiment of my invention many changes and modifications can be made therein without departing from the spirit of the invention as expressed by the appended claims.

I claim:
1. A fluid filter device comprising:
 (a) a housing having a substantially cylindrical filter chamber,
 (b) a cylindrical filter element supported in said chamber,
 (c) said housing having a fluid inlet opening into said chamber exteriorly of said filter element,
 (d) said housing having a fluid outlet opening to the interior of said filter element,
 (e) means selectively operable to force fluid from the outlet side of said filter element to the inlet side of said filter element,
 (f) said housing having a fluid port opening to the inlet side of said filter element and adapted for connection to a source of pressurized fluid,
 (g) means directing fluid from said fluid port axially along the inlet side of said filter element to said inlet during operation of said fluid forcing means, and
 (h) said directing means comprising a cylindrical wall portion spaced radially outwardly from said filter element and disposed intermediate said fluid port and said filter element, and means providing communication between said fluid port and the space intermediate said filter element and said wall portion.

2. The filter device as defined in claim 1 and in which said fluid forcing means comprises a vane member having an edge disposed closely adjacent the outlet side of said filter element and means operable to rotate said vane member.

3. The fluid filter device as defined in claim 1 and in which fluid forcing means comprises
 (a) a vane member disposed within said filter element and having an edge positioned closely adjacent the outlet side thereof,
 (b) means rotating said vane member, and
 (c) means directing fluid from said outlet into said filter element.

4. A fluid filter device comprising:
 (a) a housing having a filter chamber,
 (b) a filter element supported in said chamber,
 (c) said housing having a fluid inlet opening into said chamber exteriorly of said filter element,
 (d) said housing having a fluid outlet opening to the interior of said filter element,
 (e) means selectively operable to force fluid from the outlet side of said filter element to the inlet side of said filter element,
 (f) said housing having a fluid port opening to the inlet side of said filter element adapted for connection to a source of pressurized fluid,
 (g) means directing fluid from said port axially along the inlet side of said filter element to said inlet during operation of said fluid forcing means comprising a wall portion spaced outwardly from said filter element and disposed intermediate said fluid port and said filter element, and means providing communication between said fluid port and the space intermediate said filter element and said wall portion.

5. The filter device as defined in claim 4, and in which said fluid forcing means comprises a vane member having an edge disposed closely adjacent the outlet side of said filter element and means operable to rotate said vane member.

References Cited
UNITED STATES PATENTS

| | | | |
|---|---|---|---|
| 1,734,999 | 11/1929 | Cruickshank | 210—408 X |
| 1,993,175 | 3/1935 | Libbey et al. | 210—408 X |
| 2,022,016 | 11/1935 | Wardle | 210—409 X |
| 2,202,191 | 5/1940 | Cuno | 210—415 X |
| 3,174,622 | 3/1965 | Lamort | 210—415 X |
| 3,255,883 | 6/1966 | Nelson et al. | 210—415 X |

FOREIGN PATENTS

| | | |
|---|---|---|
| 1,322,890 | 2/1963 | France. |
| 1,131,081 | 6/1962 | Germany. |

REUBEN FRIEDMAN, *Primary Examiner.*

D. M. RIESS, *Assistant Examiner.*